US009619028B2

(12) United States Patent
Horii et al.

(10) Patent No.: US 9,619,028 B2
(45) Date of Patent: *Apr. 11, 2017

(54) ELECTRONIC APPARATUS AND PANEL UNIT

(71) Applicant: KYOCERA CORPORATION, Kyoto (JP)

(72) Inventors: Seiji Horii, Yokohama (JP); Kenichi Ozasa, Yokohama (JP); Keiichi Nagoshi, Higashiosaka (JP)

(73) Assignee: KYOCERA Corporation, Kyoto (JP)

( * ) Notice: Subject to any disclaimer, the term of this patent is extended or adjusted under 35 U.S.C. 154(b) by 90 days.

This patent is subject to a terminal disclaimer.

(21) Appl. No.: 14/388,456

(22) PCT Filed: Mar. 27, 2013

(86) PCT No.: PCT/JP2013/002089
§ 371 (c)(1),
(2) Date: Sep. 26, 2014

(87) PCT Pub. No.: WO2013/145739
PCT Pub. Date: Oct. 3, 2013

(65) Prior Publication Data
US 2015/0054779 A1    Feb. 26, 2015

(30) Foreign Application Priority Data

Mar. 29, 2012  (JP) ................ 2012-076914
Mar. 29, 2012  (JP) ................ 2012-077674

(51) Int. Cl.
*G06F 3/01*   (2006.01)
*H04M 1/02*  (2006.01)
(Continued)

(52) U.S. Cl.
CPC ............ *G06F 3/016* (2013.01); *H04M 1/026* (2013.01); *H04M 19/047* (2013.01); *H04R 7/10* (2013.01);
(Continued)

(58) Field of Classification Search
CPC ....... G06F 3/016; H04R 7/10; H04R 2499/15; H04R 7/045; H04R 2499/11; H04R 1/22; H04R 17/00; H04M 19/047; H04M 1/026
See application file for complete search history.

(56) References Cited

U.S. PATENT DOCUMENTS 9,131,299 B2 * 9/2015 Nabata ................. H04R 17/00
9,131,300 B2 * 9/2015 Horii ................... H04M 1/026
(Continued)

FOREIGN PATENT DOCUMENTS

JP   2004-187031 A    7/2004
JP   2005-348193 A   12/2005
(Continued)

OTHER PUBLICATIONS

Machine translation of JP 2007-82009.*
(Continued)

*Primary Examiner* — Michael Pervan
(74) *Attorney, Agent, or Firm* — Studebaker & Brackett PC (57) ABSTRACT

Frequency characteristics of an air conduction sound and a human body vibration sound are adjusted. An electronic apparatus 1 according to the present invention includes a panel 10, a piezoelectric element 30, a housing 60 for mounting the panel 10, and a member 80 attached to the piezoelectric element 30, wherein the member 80 and the panel 10 deform due to deformation of the piezoelectric element 30 and thus deliver the air conduction sound and the human body vibration sound to an object in contact with the (Continued)

panel 10 that is deforming, and the member 80 adjusts the frequency characteristics of the air conduction sound and the human body vibration sound.

19 Claims, 8 Drawing Sheets

(51) Int. Cl.
*H04M 19/04* (2006.01)
*H04R 7/10* (2006.01)
*H04R 1/22* (2006.01)
*H04R 17/00* (2006.01)
*H04R 7/04* (2006.01)

(52) U.S. Cl.
CPC ............... *H04R 1/22* (2013.01); *H04R 7/045* (2013.01); *H04R 17/00* (2013.01); *H04R 2499/11* (2013.01); *H04R 2499/15* (2013.01)

(56) References Cited

U.S. PATENT DOCUMENTS 9,143,867 B2 * 9/2015 Nabata .................. H04R 17/00
9,191,748 B2 * 11/2015 Nabata .................. H04M 1/035
2006/0227981 A1 10/2006 Miyata
2010/0219722 A1 9/2010 Onishi et al.
2015/0086047 A1 * 3/2015 Horii ....................... H04R 7/10
381/151

FOREIGN PATENT DOCUMENTS

| | | |
|---|---|---|
| JP | 2007-082009 A | 3/2007 |
| JP | 2008-252878 A | 10/2008 |
| WO | 2004/023199 A1 | 3/2004 |
| WO | 2007/083497 A1 | 7/2007 |
| WO | 2010/106736 A1 | 9/2010 |

OTHER PUBLICATIONS

Machine translation of JP 2004-187031.*
Machine translation of JP 2005-348193.*
International Search Report; PCT/JP2013/002089; May 14, 2013.
Written Opinion of the International Searching Authority; PCT/JP2013/002089; May 14, 2013; with English language concise explanation.
An Office Action; "Notice of Reason for Rejection," issued by the Japanese Patent office on Sep. 2, 2014, which corresponds to Japanese Patent Application No. 2014-507435; with English language concise explanation.

* cited by examiner

ELECTRONIC APPARATUS AND PANEL UNIT

CROSS REFERENCE TO RELATED APPLICATIONS

This application claims priority to and the benefit of Japanese Patent Application No. 2012-076914 (filed on Mar. 29, 2012) and Japanese Patent Application No. 2012-077674 (filed on Mar. 29, 2012), the entire contents of which are incorporated herein by reference.

TECHNICAL FIELD

The present invention relates to an electronic apparatus for vibrating a panel by applying a predetermined electrical signal (a sound signal) on a piezoelectric element and for delivering an air conduction sound and a human body vibration sound to a user by delivering the vibration of the panel to a user's body.

BACKGROUND ART

Patent Document 1 describes an electronic device such as a mobile phone that delivers an air conduction sound and a bone conduction sound to a user. Patent Document 1 also describes that the air conduction sound is a sound that is delivered to the auditory nerve of the user when vibration of the air caused by vibration of an object reaches the eardrum through the ear canal and vibrates the eardrum. Patent Document 1 further describes that the human body vibration sound is a sound that is delivered to the auditory nerve of the user via a part of a user's body (for example, the cartilage of the ear) in contact with an object being vibrating.

In the phone described in Patent Document 1, a vibrator in the form of a short rectangular plate made of a piezoelectric bimorph and a flexible material is attached to an outer surface of a housing via an elastic member. Patent Document 1 also describes that, upon application of a voltage on the piezoelectric bimorph of the vibrator, a piezoelectric material stretches in a longitudinal direction causing bending vibration of the vibrator and thus, when the user brings the vibrator into contact with the auricle, the air conduction sound and the human body vibration sound are delivered to the user.

RELATED ART DOCUMENT

Patent Document

Patent Document 1: Japanese Patent Application Laid-Open Publication No. 2005-348193

SUMMARY OF INVENTION

Technical Problem

The electronic apparatus described in Patent Document 1 does not consider adjustment of frequency characteristics of the air conduction sound and the human body vibration sound.

An object of the present invention is to provide an electronic apparatus capable of adjusting the frequency characteristics of the air conduction sound and the human body vibration sound.

Solution to Problem

An electronic apparatus according to the present invention includes a panel, a piezoelectric element, a housing for mounting the panel, and a member attached to the piezoelectric element, wherein the member and the panel deform due to deformation of the piezoelectric element and thus deliver an air conduction sound and a human body vibration sound to an object in contact with the panel that is deforming, and the member adjusts frequency characteristics of the air conduction sound and the human body vibration sound.

The member adjusts the frequency characteristics of the air conduction sound and the human body vibration sound in such a manner that a dip in the frequency characteristics may avoid a frequency band of the sound which is assumed to be used by the electronic apparatus.

The member may be disposed between the panel and the piezoelectric element and attached to the piezoelectric element by a first joint member.

The member may be made of glass fibers and resin, metal fibers and resin, or carbon fibers and resin.

The panel may vibrate in a region larger than a region having a length corresponding to a distance from the inferior antihelix crus of the human ear to the antitragus and a width corresponding to a distance from the tragus to the antihelix.

The member may be attached to the panel by a second joint member.

The first joint member may be a non-thermocurable adhesive.

The first joint member may be a double-sided adhesive tape.

The second joint member may be the non-thermocurable adhesive.

The second joint member may be the double-sided adhesive tape.

The panel may be attached to the housing by a third joint member.

The third joint member may be the non-thermocurable adhesive.

The third joint member may be the double-sided adhesive tape.

The panel may partially or entirely constitute any one of a display panel, an operation panel, a cover panel, and a lid panel for allowing removal of a battery.

When the panel constitutes the display panel, the piezoelectric element may be disposed outside a display area for executing a display function.

The panel may deform in any region thereof to deliver the air conduction sound and the human body vibration sound.

The panel, in a vibration region thereof, includes a plurality of locations for vibrating in a direction intersecting with a main surface of the panel, in each of which a value of amplitude of the vibration may change with time from positive to negative or vice versa.

The member may be made of metal.

A panel unit according to the present invention includes a panel, a piezoelectric element, and a member attached to the piezoelectric element, wherein the member and the panel deform due to deformation of the piezoelectric element and thus deliver an air conduction sound and a human body vibration sound to an object in contact with the panel that is deforming, and the member adjusts frequency characteristics of the air conduction sound and the human body vibration sound.

The member may be made of metal.

Effect if the Invention

According to the electronic apparatus of the present invention, the frequency characteristics of the air conduction sound and the human body vibration sound may be adjusted.

DESCRIPTION OF EMBODIMENTS

Figure 1:
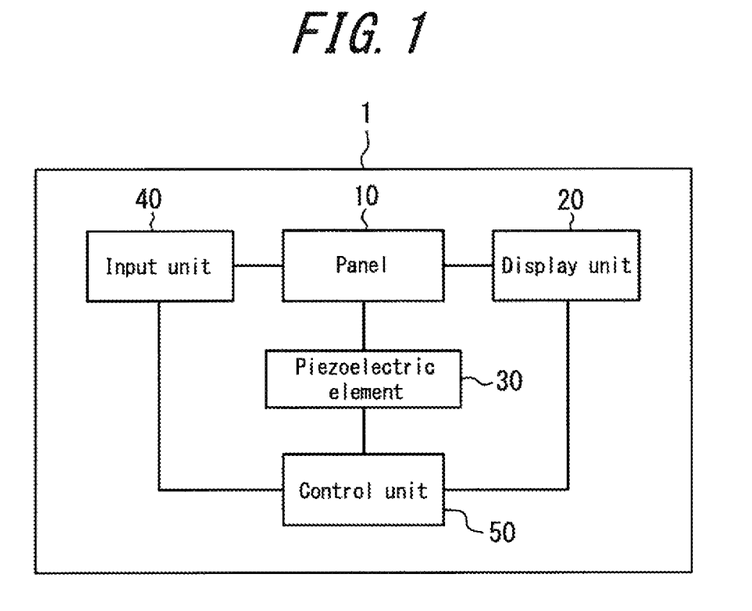
FIG. 1 is a diagram illustrating a functional block of an electronic apparatus according to one embodiment of the present invention.

Hereinafter, embodiments of the present invention will be described in detail with reference to the accompanying drawings. FIG. 1 is a diagram illustrating a functional block of an electronic apparatus 1 according to one embodiment of the present invention. The electronic apparatus 1 is a mobile phone (a smart phone), for example, and includes a panel 10, a display unit 20, a piezoelectric element 30, an input unit 40, and a control unit 50.

The panel 10 is a touch panel for detecting a contact, or a cover panel and the like for protecting the display unit 20. The panel 10 is made of, for example, glass or synthetic resin such as acrylic and the like. The panel 10 preferably has a plate-like shape. The panel 10 may be a flat plate or a curved panel with a smoothly inclined surface. The panel 10 as the touch panel detects a contact by a user's finger, a pen, a stylus pen and the like. A detection method of the touch panel may be any one of an electrostatic capacitance method, a resistance film method, a surface acoustic wave method (or an ultrasound method), an infrared method, an electromagnetic induction method, a load detection method and the like.

The display unit 20 is a display device such as a liquid crystal display, an organic EL display, an inorganic EL display and the like. The display unit 20 is disposed on a rear side of the panel 10. The display unit 20 is disposed on the rear side of the panel 10 by using, for example, a joint member (for example, an adhesive). The display unit 20 may be attached to the panel 10 by the joint member (for example, the adhesive), or disposed spaced apart from the panel 10 and supported by a housing of the electronic device 1.

The piezoelectric element 30 is an element that, upon application of an electrical signal (a voltage), stretches or curves (bends) in accordance with an electromechanical coupling coefficient of a material constituting the piezoelectric element. The piezoelectric element may be made of, for example, ceramic or crystal. The piezoelectric element 30 may be a unimorph, a bimorph, or a laminated piezoelectric element. The laminated piezoelectric element includes a laminated unimorph element including laminated unimorphs (for example, 16 to 24 layers thereof), or a laminated bimorph element including laminated bimorphs (for example, 16 to 24 layers thereof). The laminated piezoelectric element has a multilayer structure including a plurality of dielectric layers made of, for example, PZT (lead zirconate titanate) and electrode layers disposed therebetween. The unimorph stretches upon application of the electrical signal (voltage), while the bimorph bends upon application of the electrical signal (voltage).

The piezoelectric element 30 is disposed on a rear surface of the panel 10 (an internal surface of the electronic apparatus 1). The piezoelectric element 30 is attached to the panel 10 by a joint member (for example, a double-sided adhesive tape). The piezoelectric element 30 may be attached to the panel 10 via an adjustment member (for example, sheet metal, a combination of glass fibers and resin, a combination of metal fibers and resin, or a combination of carbon fibers and resin) for adjusting frequency characteristics of sounds. The piezoelectric element 30 is disposed on the rear surface of the panel 10 and spaced apart from an internal surface of the housing by a predetermined distance. The piezoelectric element 30 is preferably spaced apart from the internal surface of the housing by the predetermined distance also when the piezoelectric element 30 is stretching or curving. That is, a distance between the piezoelectric element 30 and the internal surface of the housing is preferably greater than a maximum deformation amount of the piezoelectric element 30.

The input unit 40 receives an input operation from a user and is constituted by using, for example, an operation button (an operation key). When the panel 10 is the touch panel, the panel 10 may also receive the input operation from the user by detecting the contact by the user.

The control unit 50 is a processor for controlling the electronic apparatus 1. The control unit 50 applies a predetermined electrical signal (a voltage corresponding to a sound signal) to the piezoelectric element 30. The voltage applied to the piezoelectric element 30 by the control unit 50 may be, for example, ±15 V, which is greater than a voltage ±5 V applied by what is called a panel speaker used for the purpose of delivering sound by an air conduction sound as opposed to a human body vibration sound. Thereby, when the user presses the panel 10 against a user's body applying force of, for example, 3 N or greater (force of 5 N to 10 N), the panel 10 may generate sufficient vibration allowing generation of the human body vibration sound via a part of the user's body. Note that a level of the voltage to apply is appropriately adjustable based on fixing strength of the panel 10 to the housing or a supporting portion, or based on performance of the piezoelectric element 30. When the control unit 50 applies the electrical signal to the piezoelectric element 30, the piezoelectric element 30 stretches or bends in a longitudinal direction. At this time, the panel 10 having the piezoelectric element 30 attached thereto deforms following the stretch or bend of the piezoelectric element 30 and also vibrates. The panel 10 curves due to the stretch or bend of the piezoelectric element 30. The panel 10 is bent directly by the piezoelectric element 30. Note that "the panel 10 is bent directly by the piezoelectric element" is different from a phenomenon that, as employed by a conventional panel speaker, inertial force of a piezoelectric actuator composed of the piezoelectric element disposed inside a casing excites a specific region of the panel and deforms the panel. "The panel 10 is bent directly by the piezoelectric element" means that the stretch or bend (curve) of the piezoelectric element directly bends the panel via the joint member, or via the joint member and a reinforcing member 80 described below. Thereby, the panel 10 generates the air conduction sound and also, when the user brings a part of the user's body (for example, the cartilage of the external ear) into contact with the panel 10, generates the human body vibration sound via the part of the user's body. For example, the control unit 50 may apply the electrical signal corresponding to a sound signal of voice of the other party so as to generate the air conduction sound and the human body vibration sound corresponding to the sound signal. The sound signal may be a ringtone, or music including songs. Also, the sound signal corresponding to the electrical signal may be based on music data stored in an internal storage of the electronic device 1 or music data stored in an external server and the like to be replayed via the network.

The panel 10 vibrates in an attaching region having the piezoelectric element 30 attached thereto, as well as in a region remote from the attaching region. The panel 10, in the region to vibrate, includes a plurality of portions that vibrate in a direction intersecting with a main surface of the panel 10, in each of which a value of amplitude of the vibration changes with time from positive to negative or vice versa. The panel 10, at a certain moment, vibrates in such a manner that regions with relatively large vibration amplitude and regions with relatively small vibration amplitude are seemingly distributed in a random or periodic manner in a substantially entire panel 10. That is, over the entire panel 10, vibrations of a plurality of waves are detected. In order to prevent attenuation of the vibration of the panel 10 as described above when the user presses the panel 10 against the user's body applying the force of, for example, 5 N to 10 N, the voltage applied to the piezoelectric element 30 by the control unit 50 may be ±15 V. Thereby, the user may hear the sound by bringing the region remote from the attaching region of the panel 10 into contact with the ear.

Figure 2:
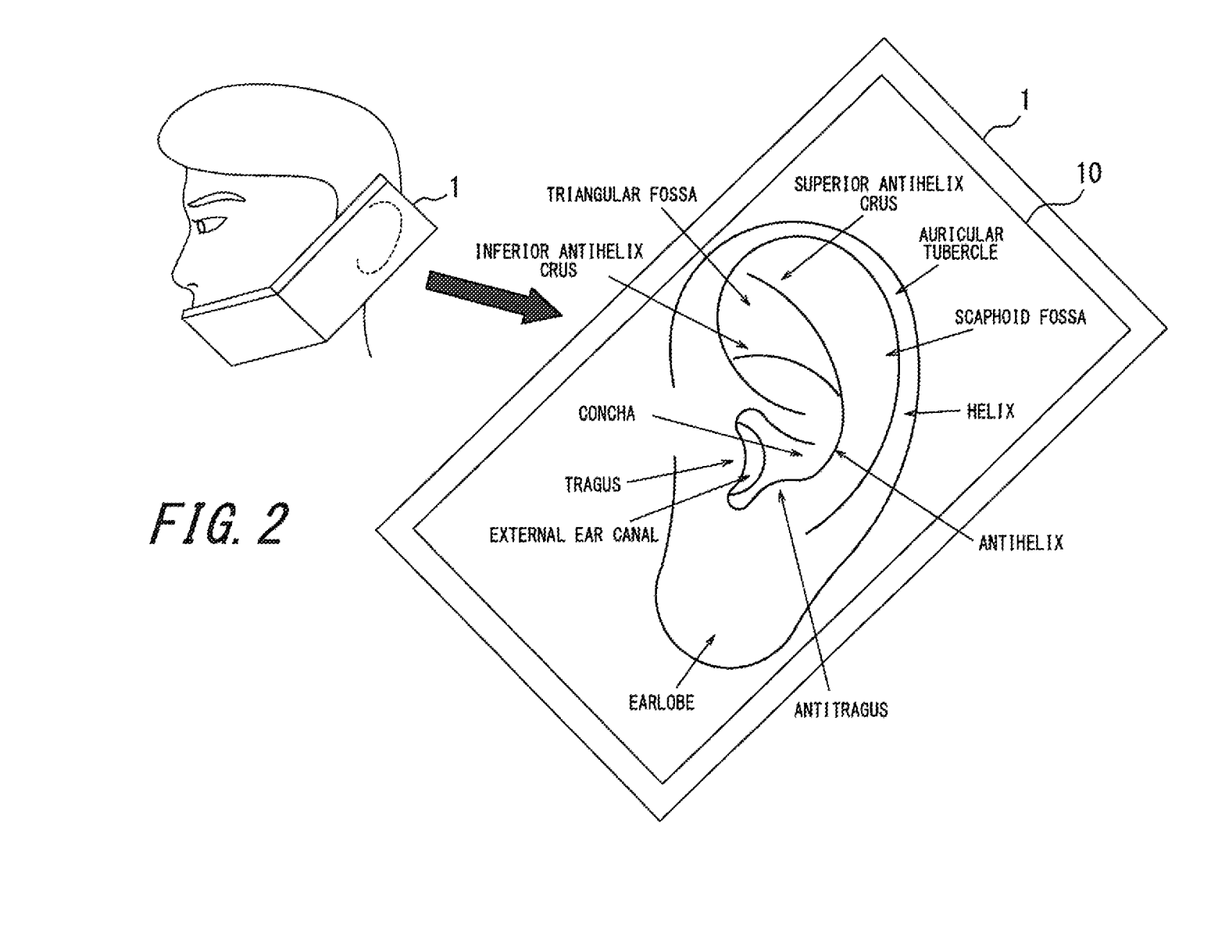
FIG. 2 is a diagram illustrating a preferred shape of a panel.

Here, the panel 10 may be in size approximately similar to the user's ear. Or, as illustrated in FIG. 2, the panel 10 may be larger than the user's ear. In this case, when the user listens to the sound, since the entire ear is likely to be covered by the panel 10 of the electronic apparatus 1, less surrounding sounds (noises) may enter the ear canal. The panel 10 needs to vibrate in a region larger than a region having a length corresponding to a distance from the inferior antihelix crus (the lower antihelix crus) to the antitragus and a width corresponding to a distance from the tragus and the antihelix. Preferably, the panel 10 vibrates in a region having a length corresponding to a distance from an area in the vicinity of the superior antihelix crus (the upper antihelix crus) of the helix to the lobe and a width corresponding to a distance from the tragus to an area in the vicinity of the antihelix of the helix. The region having the length and the width described above may be in a rectangular shape, or in an oval shape having the above length as a long diameter and the above width as a short diameter. An average ear size of Japanese people may be obtained from Database of Japanese Body Size (1992-1994) provided by Research Institute of Human Engineering for Quality Life (HQL). When the panel 10 is equal to or larger than the average ear size of Japanese people, it is considered that the panel 10 may cover most of foreign nationals' entire ears.

The electronic apparatus 1 described above, by vibrating the panel 10, may deliver the air conduction sound and the human body vibration sound via a part of the user's body (for example, the cartilage of the outer ear). Therefore, when sound at a volume similar to that of a conventional dynamic receiver is output, less sound is transmitted around the electronic apparatus 1 through air vibration by the vibration of the panel 10 as compared with that of the dynamic receiver. Accordingly, the electronic apparatus 1 is suitable for listening to, for example, a recorded message on a train or the like.

Also, since the electronic apparatus 1 described above delivers the human body vibration sound by vibrating the panel 10, when the user is wearing, for example, earphones or headphones, the user may hear the sound via the earphones or the headphones and a part of the user's body by bringing the electronic apparatus 1 into contact with the earphones or the headphones.

The electronic apparatus 1 described above delivers the sound to the user by vibrating the panel 10. Therefore, when the electronic apparatus 1 does not separately include the dynamic receiver, an opening (a sound opening) for voice transmission does not need to be formed on the housing, which allows simplification of a waterproof structure of the electronic apparatus 1. Note that, when the electronic apparatus 1 has the dynamic receiver, the sound opening is preferably sealed with a material that ventilates while blocking liquid. Such a material for ventilating while blocking liquid is, for example, Gore-Tex (registered trademark).

(First Embodiment)

Figure 3A:
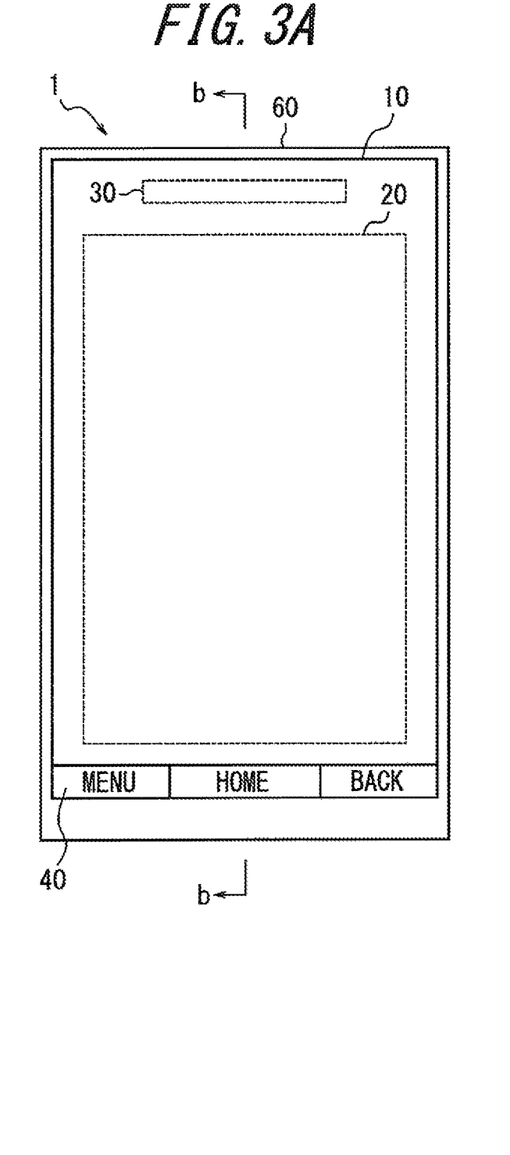
FIG. 3 are diagrams illustrating a housing structure of an electronic apparatus according to a first embodiment.
Figure 3B:
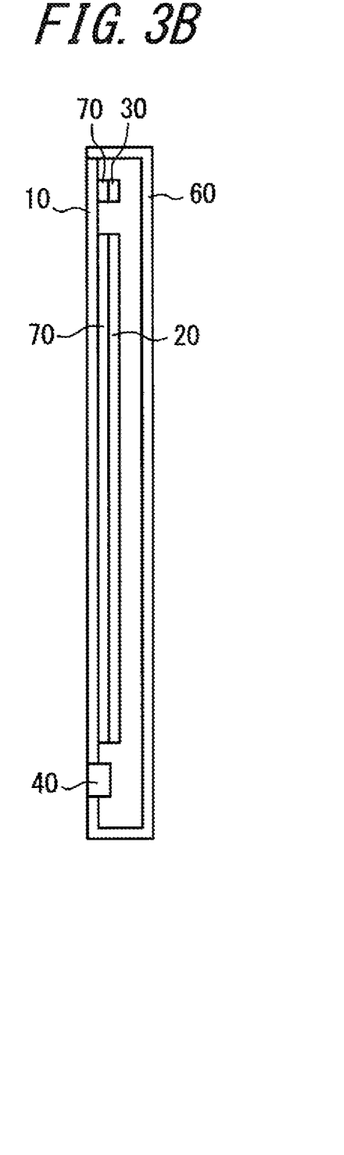

FIG. 3 are diagrams illustrating a housing structure of the electronic apparatus 1 according to a first embodiment. FIG. 3(a) is a front view, and FIG. 3(b) is a cross-sectional view taken from line b-b of FIG. 3(a). The electronic apparatus 1 illustrated in FIGS. 3 is a smartphone having a touch panel made of a glass plate serving as the panel 10 disposed on a front side of a housing 60 (for example, a metal or resin case). The panel 10 and the input unit 40 are supported by the housing 60, and each of the display unit 20 and the piezoelectric element 30 is attached to the panel 10 by a joint member 70. The joint member 70 is a thermocurable adhesive, an ultraviolet curable adhesive, the double-sided adhesive tape and the like and may be an optical elasticity resin such as, for example, a colorless and transparent acrylic ultraviolet curable adhesive. The panel 10, the display unit 20 and the piezoelectric element 30 have substantially rectangular shapes.

The display unit 20 is disposed substantially in the center of a short direction of the panel 10. The piezoelectric element 30 is spaced apart from an end of a longitudinal direction of the panel 10 by a predetermined distance and disposed in the vicinity of the end in such a manner that a longitudinal direction of the piezoelectric element 30 faces along a short side of the panel 10. The display unit 20 and the piezoelectric element 30 are disposed side by side in a direction parallel to an internal surface of the panel 10.

Figure 4:
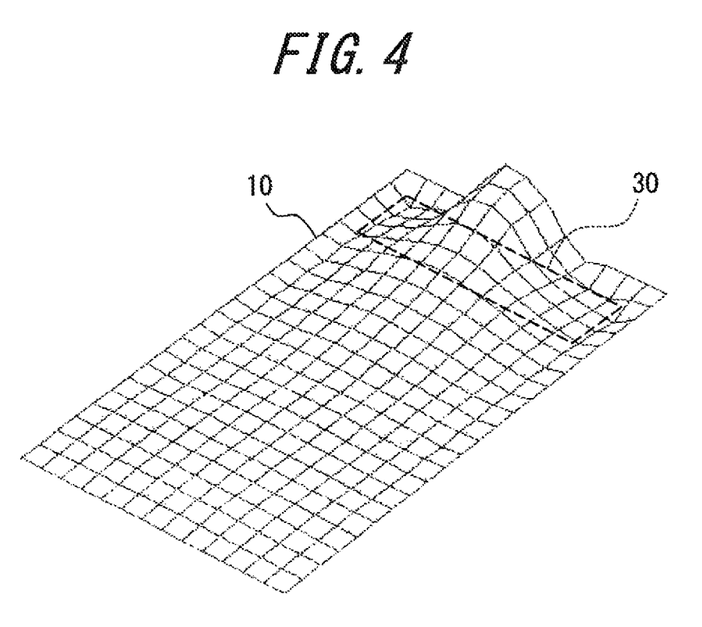
FIG. 4 is a diagram illustrating an example of vibration of a panel of the electronic apparatus according to the first embodiment.

FIG. 4 is a diagram illustrating an example of a vibration of the panel 10 of the electronic apparatus 1 according to the first embodiment. In the electronic apparatus 1 according to the first embodiment, the display unit 20 is attached to the panel 10. Therefore, a lower portion of panel 10 less vibrates than an upper portion of the panel 10 to which the piezoelectric element 30 is attached. Accordingly, sound leakage in the lower portion of the panel 10 caused by the vibration thereof may be reduced. The upper portion of the panel 10 is bent directly by the piezoelectric element 30, and the vibration attenuates in the lower portion as compared with the upper portion. The panel 10 is bent by the piezoelectric element 30 in such a manner that a region immediately above the piezoelectric element 30 in the longitudinal direction thereof rises the most as compared with its surroundings.

According to the electronic apparatus 1 of the present embodiment, as described above, the panel 10 deforms due to the deformation of the piezoelectric element 30 attached to the rear surface of the panel 10 and delivers the air conduction sound and the human body vibration sound to an object in contact with the panel 10 that is deforming Thus, without the necessity to protrude the vibrator on an outer surface of the housing 60, the air conduction sound and the human body vibration sound may be delivered to the user. Also, since there is no need to bring the piezoelectric element itself into contact with the user's ear, the piezoelectric element 30 is unlikely to be damaged. Further, deformation of the housing 60 in place of the panel 10 is likely to cause the user to drop a terminal upon generation of the vibration, whereas the vibration of the panel 10 is less likely to cause such an accident.

(Second Embodiment)

Figure 5A:
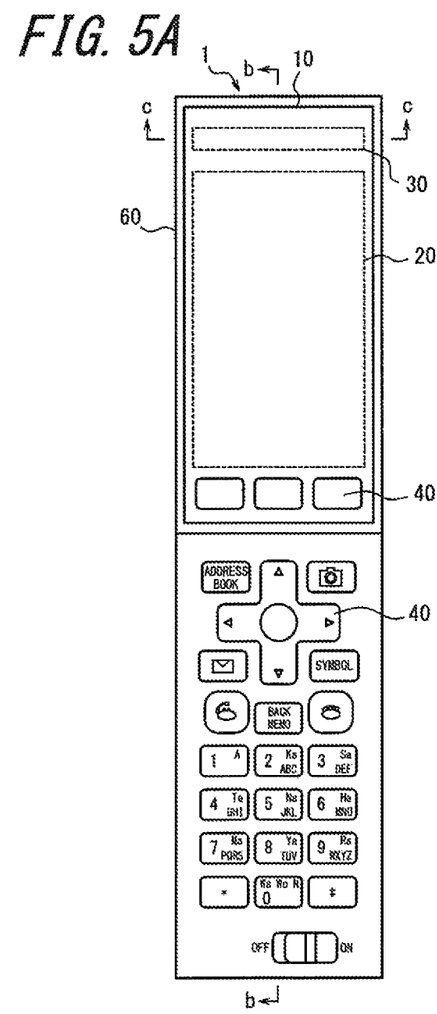
FIG. 5 are diagrams illustrating a housing structure of an electronic apparatus according to a second embodiment.
Figure 5B:
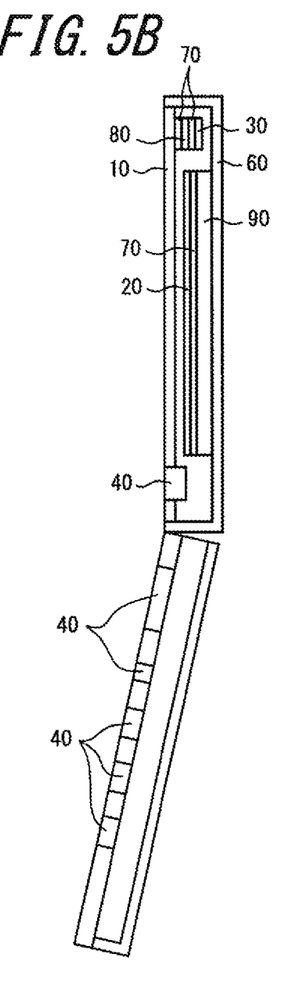
Figure 5C:
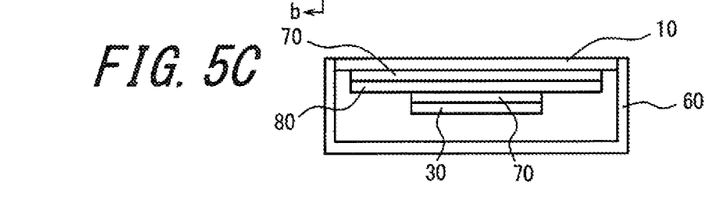

FIG. 5 are diagrams illustrating a housing structure of the electronic apparatus 1 according to a second embodiment. FIG. 5(a) is a front view, and FIG. 5(b) is a cross-sectional view taken from line b-b of FIG. 5(a). FIG. 5(c) is a cross-sectional view taken from line c-c of FIG. 5(a). The electronic apparatus 1 illustrated in FIG. 5 is a folding mobile phone terminal having a cover panel (acryl plate) serving as the panel 10 for protecting the display unit 20 disposed on a front side of an upper portion of the housing 60. According to the second embodiment, an adjustment member 80 is disposed between the panel 10 and the piezoelectric element 30. The adjustment member 80 is, for example, an elastic member such as rubber or silicon. Or, the adjustment member 80 may be made of, for example, a conductive material. The adjustment member 80 may be, for example, a copper plate, a steel plate, or a phosphor bronze plate. Or, the adjustment member 80 may be a metal plate made of, for example, aluminum and the like having a certain degree of elasticity. The adjustment member 80 may be a stainless steel plate such as, for example, SUS304. The adjustment member 80 may be made up of a plurality of types of metals such as, for example, a metal plate made up of silver-plated copper plate, a plate including a lamination of a copper plate and an aluminum plate, or the like. A thickness of the metal plate such as the stainless steel plate or the like is preferably, for example, 0.2 mm to 0.8 mm based on the voltage or the like applied to the piezoelectric element 30. Or, the adjustment member 80 may be, for example, a resin plate. Here, resin forming the resin plate may be, for example, a polyamide resin. As the polyamide resin, there is, for example, Lenny (registered trademark) made of a crystalline thermoplastic resin obtained from m-xylylenediamine and adipic acid having high strength and elasticity. As such a polyamide resin, a reinforced resin containing the polyamide resin itself as a base polymer and reinforced by glass fibers, metal fibers, or carbon fibers may be used. According to an amount of the glass fibers, the metal fibers, or the carbon fibers added to the polyamide resin, the strength and the elasticity are appropriately adjusted. The reinforced resin described above is formed by, for example, impregnating a substrate formed by knitting the glass fibers, the metal fibers, or the carbon fibers with the resin and then allowing the resulting material to cure. Or, the reinforced resin may be formed by mixing fine fiber pieces into a liquid resin and allowing the resin to cure. Or, the reinforced resin may be composed of a lamination of the substrate formed of knitted fibers and a resin layer.

That is, the electronic apparatus 1 according to the second embodiment has a structure in which the piezoelectric element 30 and the adjustment member 80 are attached together by the joint member 70 and, further, the adjustment member 80 and the panel 10 are attached together by the joint member 70. According to the second embodiment, also, the display unit 20 is supported by the housing 60 instead of being attached to the panel 10. That is, the electronic apparatus 1 according to the second embodiment has a structure in which the display unit 20 is spaced apart from the panel 10, and the display unit 20 and a supporting portion 90, which is a portion of the housing 60, are attached together by the joint member 70. Note that the supporting portion 90 may be either the portion of the housing 60 or a metal or resin member separate from the housing 60.

Figure 6:
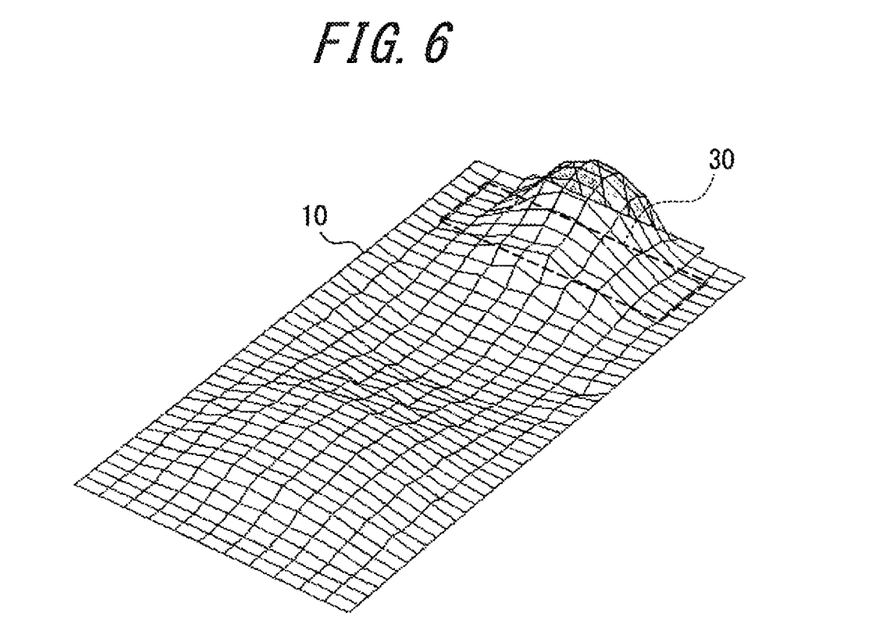
FIG. 6 is a diagram illustrating an example of vibration of a panel of the electronic apparatus according to the second embodiment.

FIG. 6 is a diagram illustrating an example of a vibration of the panel 10 of the electronic apparatus 1 according to the second embodiment. In the electronic apparatus 1 according to the second embodiment, since the panel 10 is an acrylic plate having lower rigidity than that of the glass plate and, also, the display unit 20 is not attached to the rear surface of the panel 10, amplitude generated by the piezoelectric element 30 is larger than that of the electronic apparatus 1 according to the first embodiment illustrated in FIG. 4. Also, the panel 10 vibrates in the attaching region having the piezoelectric element 30 attached thereto, as well as in the region remote from the attaching region. Accordingly, the user may hear the air conduction sound via the air and also the human body vibration sound by bringing any region of the panel 10 into contact with the ear.

Figure 7:
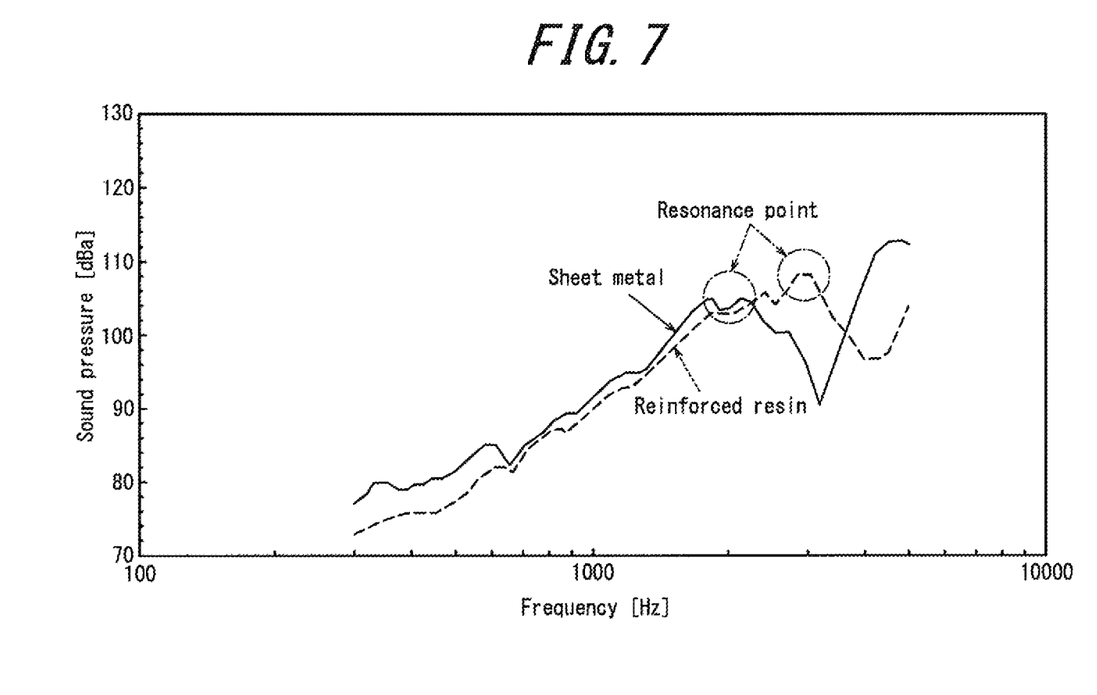
FIG. 7 is a diagram illustrating an example of a change in frequency characteristics caused by an adjustment member.

FIG. 7 is a diagram illustrating an example of a change in the frequency characteristics caused by the adjustment member 80. FIG. 7 shows both the frequency characteristics in using sheet metal such as SUS 304 described above as the adjustment member 80 and the frequency characteristics in using the reinforced resin such as Lenny (registered trademark) as the adjustment member 80. A horizontal axis indicates the frequency, and a vertical axis indicates a sound pressure. A resonance point in using the reinforced resin is about 2 kHz, and the resonance point in using the sheet metal is about 1 kHz. The dip in using the reinforced resin is about 4 kHz, and the dip in using the sheet metal is about 3 kHz. That is, when the reinforced resin is used, as compared with the sheet metal, the resonance point of the panel 10 is positioned in a high frequency domain, and the dip in the frequency characteristics is positioned in an even higher frequency domain. Since a frequency band used for a voice call is 300 Hz to 3.4 kHz, when the reinforced resin is used as the adjustment member 80, the dip may avoid the frequency band in use. Note that, when the sheet metal is used as the adjustment member 80, appropriate adjustment of a type or composition of the metal constituting the sheet metal or a thickness thereof allows the dip to avoid the frequency band used by the electronic apparatus 1. Also, when the sheet metal and the reinforced resin are compared to each other, the reinforced resin may further reduce an influence on antenna performance than the sheet metal. Further, the reinforced resin is hardly plastically deformed as compared with the sheet metal and thus offers an advantage that acoustic characteristic is hardly changed. As compared with the sheet metal, also, the reinforced resin may be suppressed from rising temperature when the sound is generated. Further, in using various sheet metals described above as the adjustment member 80, when, for example, the adjustment member 80 is disposed in the vicinity of an attaching area of the housing 60 and the panel 10 and, simultaneously, electrically connected to a reference potential section (GND, not shown), static electricity entering the electronic apparatus 1 through, for example, a gap between the housing 60 and the panel 10 may be led to the reference potential section. Thereby, a possibility to damage electronic components inside the electronic apparatus 1 may be reduced. Further, in using the stainless steel plate or the phosphor bronze plate as the adjustment member 80, electrically connecting the stainless steel plate or the phosphor bronze plate to a power supply unit (not shown) allows the stainless steel plate or the phosphor bronze plate to operate as an antenna element.

According to the electronic apparatus 1 of the present embodiment, as described above, due to the deformation of the piezoelectric element 30 attached to the rear surface of the panel 10 via the adjustment member 80, the adjustment member 80 and the panel 10 deform and thus deliver the air conduction sound and the human body vibration sound to an object in contact with the panel 10 that is deforming. Accordingly, without the necessity to protrude the vibrator on the outer surface of the housing 60, the air conduction sound and the human body vibration sound may be delivered to the user. Further, by using the adjustment member 80, a resonance frequency may be moved and thus the frequency characteristics may be adjusted.

Also, the adjustment member 80 makes the dip in the frequency characteristics of the air conduction sound and the human body vibration sound avoid a frequency band of the sound which is assumed to be used the electronic apparatus 1. For example, the adjustment member 80 allows a position of the dip to avoid a call band (for example, 300 Hz to 3.4 kHz), thereby improving the frequency characteristics of the call band.

Also, the panel 10 vibrates in any region thereof including the attaching region having the piezoelectric element 30 attached thereto so as to deliver the air conduction sound and the human body vibration sound. Accordingly, the user may hear the air conduction sound via the air and also the human body vibration sound by bringing any region of the panel 10 into contact with the ear.

Further, the adjustment member 80 is attached to the panel 10 by the adjustment member 70. Thereby, the adjustment member 80 may be attached to the panel 10 while hardly inhibiting a degree of freedom of deformation of the piezoelectric element 30. The joint member 70 may be a non-thermocurable adhesive, which offers an advantage that, during curing, thermal stress shrinkage is hardly generated between the piezoelectric element 30 and the panel 10. Or, the joint component 70 may be a double-sided adhesive tape, which offers an advantage that shrinkage stress, which is caused in using the adhesive, is hardly applied between the piezoelectric element 30 and the panel 10.

Also, disposing the adjustment member 80 between the piezoelectric element 30 and the panel 10 may reduce a possibility that, when, for example, an external force is applied to the panel 10, the external force is transmitted to and damage the piezoelectric element 30. Also, when the panel 10 is pressed hard against the human body, the vibration of the panel hardly attenuates. Further, disposing the adjustment member 80 between the piezoelectric element 30 and the panel 10 causes reduction in the resonance frequency of the panel 10, thereby improving acoustic characteristic in a low frequency band. Note that, in place of the adjustment member 80, a sheet-shaped weight may be attached to the piezoelectric element 30 by the joint member 70.

Although the present invention has been described based on the figures and the embodiments, it is to be understood that various changes and modifications may be implemented based on the present disclosure by those who are ordinarily skilled in the art. Accordingly, such changes and modifications are included in a scope of the present invention. For example, functions and the like included in each member, each step and the like may be rearranged without logical inconsistency, so as to combine a plurality of components or steps together or to divide them.

Figure 8:
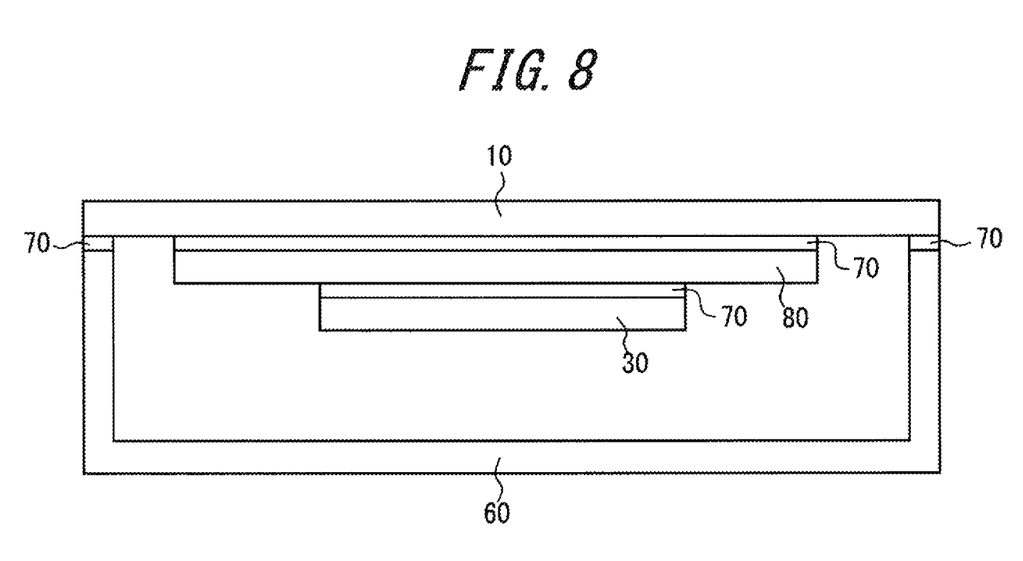
FIG. 8 is a diagram illustrating an example of attachment of the panel and a housing.

As illustrated in FIG. 8, for example, the panel 10 may be attached to the housing 60 by the joint component 70. Thereby, the vibration from the panel 10 is hardly delivered in a direct manner to the housing 60 and, as compared with a structure in which the housing 60 itself greatly vibrates, a risk that the user drops the electronic apparatus 1 may be reduced. Also, the joint component 70 may be a non-thermocurable adhesive, which offers an advantage that, during curing, the thermal stress shrinkage is hardly generated between the housing 60 and the panel 10. Or, the joint component 70 may be the double-sided adhesive tape, which offers an advantage that shrinkage stress, which is caused in using the adhesive, is hardly applied between the housing 60 and the panel 10.

For example, when the electronic apparatus 1 has a structure in which the panel 10 and the display unit 20 do not overlap each other, the piezoelectric element 30 may be disposed in the center of the panel 10. When the piezoelectric element 30 is disposed in the center of the panel 10, the vibration of the piezoelectric element 30 is delivered equally to the entire panel 10, whereby quality of the air conduction sound may be improved and the user may recognize the human body vibration sound by bringing various regions of the panel 10 into contact with the ear. Similarly to the above embodiment, any number of the piezoelectric elements 30 may be attached.

Also, although in the electronic apparatus 1 described above the piezoelectric element 30 is attached to the panel 10, the piezoelectric element 30 may be attached elsewhere. For example, the piezoelectric element 30 may be attached to a battery lid that is attached to the housing 60 for covering a battery. In the electronic apparatus 1 such as the mobile phone terminal and the like, since the battery lid is often attached to a plane different from a plane having the panel 10, such structure allows the user to hear the sound by bringing a surface other than the one with the panel 10 into contact with a part of the body (for example, the ear).

Further, the panel 10 may partially or entirely constitute any one of a display panel, an operation panel, the cover panel, a lid panel for allowing removal of the battery. Especially, when the panel 10 constitutes the display panel, the piezoelectric element 30 is disposed outside a display area for executing a display function. This offers an advantage that a display is hardly inhibited.

REFERENCE SIGNS LIST 1 electronic apparatus
10 panel
20 display unit
30 piezoelectric element
40 input unit
50 control unit
60 housing
70 joint member
80 adjustment member
90 supporting portion

The invention claimed is:
1. An electronic apparatus comprising:
a panel;
a piezoelectric element;
a housing for mounting the panel; and
a member attached to the piezoelectric element, wherein
the member and the panel deform due to deformation of the piezoelectric element and thus deliver an air con- duction sound and a human body vibration sound to an object in contact with the panel that is deforming, the member adjusts frequency characteristics of the air conduction sound and the human body vibration sound, and the panel vibrates in a region larger than a region having a length corresponding to a distance from the inferior antihelix crus of the human ear to the antitragus and a width corresponding to a distance from the tragus to the antihelix.

2. The electronic apparatus according to claim 1, wherein the member adjusts the frequency characteristics of the air conduction sound and the human body vibration sound in such a manner that a dip in the frequency characteristics avoid a frequency band of the sound which is assumed to be used by the electronic apparatus.

3. The electronic apparatus according to claim 1, wherein the member is disposed between the panel and the piezoelectric element and attached to the piezoelectric element by a first joint member.

4. The electronic apparatus according to claim 3, wherein the first joint member is a non-thermocurable adhesive.

5. The electronic apparatus according to claim 3, wherein the first joint member is a double-sided adhesive tape.

6. The electronic apparatus according to claim 1, wherein the member is made of glass fibers and resin, metal fibers and resin, or carbon fibers and resin.

7. The electronic apparatus according to claim 1, wherein the member is attached to the panel by a second joint member.

8. The electronic apparatus according to claim 7, wherein second joint member is the non-thermocurable adhesive.

9. The electronic apparatus according to claim 7, wherein the second joint member is the double-sided adhesive tape.

10. The electronic apparatus according to claim 1, wherein the panel is attached to the housing by a third joint member.

11. The electronic apparatus according to claim 10, wherein the third joint member is the non-thermocurable adhesive.

12. The electronic apparatus according to claim 10, wherein the third joint member is the double-sided adhesive tape.

13. The electronic apparatus according to claim 1, wherein the panel partially or entirely constitutes any one of a display panel, an operation panel, a cover panel, and a lid panel for allowing removal of a battery.

14. The electronic apparatus according to claim 13, wherein, when the panel constitutes the display panel, the piezoelectric element is disposed outside a display area for executing a display function.

15. The electronic apparatus according to claim 1, wherein the panel deforms in any region thereof to deliver the air conduction sound and the human body vibration sound.

16. The electronic apparatus according to claim 1, wherein panel, in a vibration region thereof, includes a plurality of locations for vibrating in a direction intersecting with a main surface of the panel, in each of which a value of amplitude of the vibration changes with time from positive to negative or vice versa.

17. The electronic apparatus according to claim 1, wherein the member is made of metal.

18. A panel unit comprising:

a panel;

a piezoelectric element; and a member attached to the piezoelectric element, wherein the member and the panel deforms due to deformation of the piezoelectric element and thus deliver an air conduction sound and a human body vibration sound to an object in contact with the panel that is deforming, the member adjusts frequency characteristics of the air conduction sound and the human body vibration sound, and the panel vibrates in a region larger than a region having a length corresponding to a distance from the inferior antihelix crus of the human ear to the antitragus and a width corresponding to a distance from the tragus to the antihelix.

19. The panel unit according to claim 18, wherein the member is made of metal.

* * * * *